United States Patent [19]

Iizuka

[11] Patent Number: 5,111,718
[45] Date of Patent: May 12, 1992

[54] LINE PRESSURE CONTROL FOR AUTOMATIC TRANSMISSION

[75] Inventor: Naonori Iizuka, Shizuoka, Japan

[73] Assignee: Jatco Corporation, Japan

[21] Appl. No.: 718,652

[22] Filed: Jun. 21, 1991

[30] Foreign Application Priority Data

Jun. 22, 1990 [JP] Japan .................................. 2-164938

[51] Int. Cl.$^5$ .............................................. B60K 41/06
[52] U.S. Cl. ............................................ 74/866; 74/878
[58] Field of Search .................. 74/856, 859, 866, 878

[56] References Cited

U.S. PATENT DOCUMENTS

| | | | |
|---|---|---|---|
| 4,730,521 | 3/1988 | Hayasaki et al. | 74/867 |
| 4,730,522 | 3/1988 | Morimoto | 74/866 X |
| 4,807,496 | 2/1989 | Hayasaki et al. | 74/866 |
| 4,831,896 | 5/1989 | Sakakiyama | 74/856 |
| 4,850,935 | 7/1989 | Morimoto | 74/866 X |
| 4,882,952 | 11/1989 | Kashihara et al. | 74/866 X |
| 4,890,515 | 1/1990 | Taniguchi et al. | 74/866 |
| 4,945,482 | 7/1990 | Nishikawa et al. | 74/878 X |

FOREIGN PATENT DOCUMENTS 61-130652 6/1986 Japan .
63-92863 4/1988 Japan .
63-251652 10/1988 Japan .

*Primary Examiner*—Richard Lorence
*Assistant Examiner*—William O. Trousdell
*Attorney, Agent, or Firm*—Ronald P. Kananen

[57] ABSTRACT

In order to prevent the line pressure level from being adjusted to abnormally low levels during the operation of a high load device such as an air conditioner compressor, oil pump and the like, which device consumes energy output from the engine and reduces the amount of torque which is supplied to the input shaft of the transmission, the adaptive correction of the line pressure level is inhibited while the high load device or devices are sensed as being in use.

14 Claims, 5 Drawing Sheets

FIG. 2

| | C18 | C20 | C22 | C24 | B28 | B26 | OWC 30 | OWC 29 | GEAR RATIO | $\alpha_1 = 0.440$<br>$\alpha_2 = 0.493$ |
|---|---|---|---|---|---|---|---|---|---|---|
| D RANGE 1ST | | | ○ | | | | ○ | ○ | $\dfrac{1+\alpha_2}{\alpha_2}$ | 3.027 |
| D RANGE 2ND | | ○ | ○ | | ○ | | ○ | | $\dfrac{\alpha_1+\alpha_2+\alpha_1\alpha_2}{\alpha_2(1+\alpha_1)}$ | 1.619 |
| D RANGE 3RD | | ○ | ○ | ○ | | | ○ | | 1 | 1.000 |
| D RANGE 4TH | | | (○) | ○ | ○ | | | | $\dfrac{1}{1+\alpha_1}$ | 0.694 |
| ENGINE BRAKING 1ST | | | (○) | ○ | | ○ | (○) | (○) | | |
| ENGINE BRAKING 2ND | | ○ | (○) | ○ | ○ | | (○) | | | |
| ENGINE BRAKING 3RD | | ○ | (○) | | | | (○) | | | |
| ENGINE BRAKING 4TH | | | (○) | | ○ | | | | | |
| REVERSE | ○ | | | | | ○ | | | $-\dfrac{1}{\alpha_1}$ | -2.272 |

( ) UNRELATED TO TORQUE TRANSMISSION

LINE PRESSURE CONTROL FOR AUTOMATIC TRANSMISSION

BACKGROUND OF THE INVENTION

1. Field of the Invention

The present invention relates generally to a line pressure control arrangement for an automatic transmission which includes an adaptive self-adjusting feature which compensates for wear and/or temperature changes, and more specifically to such a system which modifies the updating process in accordance with the use of auxiliary devices which consume engine power output and which reduce the amount of torque which is actually supplied to the transmission to drive the vehicle.

2. Description of the Prior Art

JP-A-63-92863 discloses a transmission arrangement of the nature wherein, in order to obviate the deterioration of shift characteristics due to friction element wear and/or changes in hydraulic fluid temperature and the like, the level, to which the line pressure should be controlled, is frequently updated by determining the actual time period defined between the point in time at which a given shift initiates and the point in time at which the shift is completed, with a predetermined optimal time. In the event that the actual period required for the shift to take place is found to be longer than the predetermined one, the level of the line pressure is incremented and vice versa.

However, with this type of arrangement in the event that auxiliary devices such as air conditioners and the like are provided, the amount of engine torque, which is required to drive the compression during use of the same, is substantial and reduces the actual amount of torque which is being supplied to the input shaft of the transmission. This creates a problem in that, during the use of such power consuming devices, the line pressure tends to be adjusted to a level lower than normal in order to compensate for the reduced amount of torque being supplied to the transmission. Accordingly, if the use of the power consuming device is terminated, the amount of engine torque which was used to drive the same is then added to the torque being supplied to the transmission. This brings about the situation wherein the level of line pressure is temporarily set at a level which is inadequate for the increased amount of torque being currently supplied and tends to result in friction element slippage and the like. Conversely, if the power consuming device is switched on after a period of non-use, the reverse situation, wherein the line pressure is set at level which is higher than that required for the amount of torque being supplied to the transmission input shaft, tends to come about. Under these conditions the excessively high line pressure level tends to engage the friction elements more abruptly than desired and leads to the generation of shift and/or select shock.

SUMMARY OF THE INVENTION

An object of the present invention is to provide a control which obviates the above mentioned type of drawback wherein the line pressure level is adjusted to abnormally low levels during the operation of high load devices such as air conditioner compressors, power steering oil pumps and the like, which consume energy output from the engine and reduce the amount of torque which is supplied to the input shaft of the transmission.

In brief, the above object is achieved by an arrangement wherein the adaptive correction of the line pressure level is inhibited while the high load device or devices are sensed as being in use.

More specifically, a first aspect of the present invention is provided in an automatic transmission which is operatively coupled to an engine and which features: a source of line pressure via which friction elements of the transmission are engaged; means for sensing a plurality of operational parameters which are related to transmission shifting and for using the sensed operational parameters to determine a line pressure correction value via which the level of line pressure which is output from the source is corrected; and means for sensing the operation of a device which consumes engine rotational energy and reduces the amount of engine torque which is supplied to the transmission, and for inhibiting the determination of the line pressure correction value during the operation of the device.

A second aspect of the invention is provided in a vehicle which features: an engine for producing rotational energy; a transmission operatively connected to the engine for receiving rotational energy therefrom, the transmission including a source of line pressure via which friction elements of the transmission are operated; a device which consumes rotational energy produced by the engine and reduces the amount of rotational energy supplied from the engine to the transmission, when in use; sensor means for sensing transmission operational parameters; line pressure control means responsive to the sensor means for determining the difference between an actual shift time and a target shift time and for producing a correction value via which the level of line pressure which is produced by the source is corrected; and means responsive to the operation of the device for inhibiting the production of the correction value via which the line pressure level is corrected, during the operation of the device.

BRIEF DESCRIPTION OF THE DRAWINGS

FIG. 2 is a table showing the friction engagement patterns which are used to produce the various forward and reverse speeds of the gear train shown in FIG. 1;

DETAILED DESCRIPTION OF THE INVENTION

Figure 1:
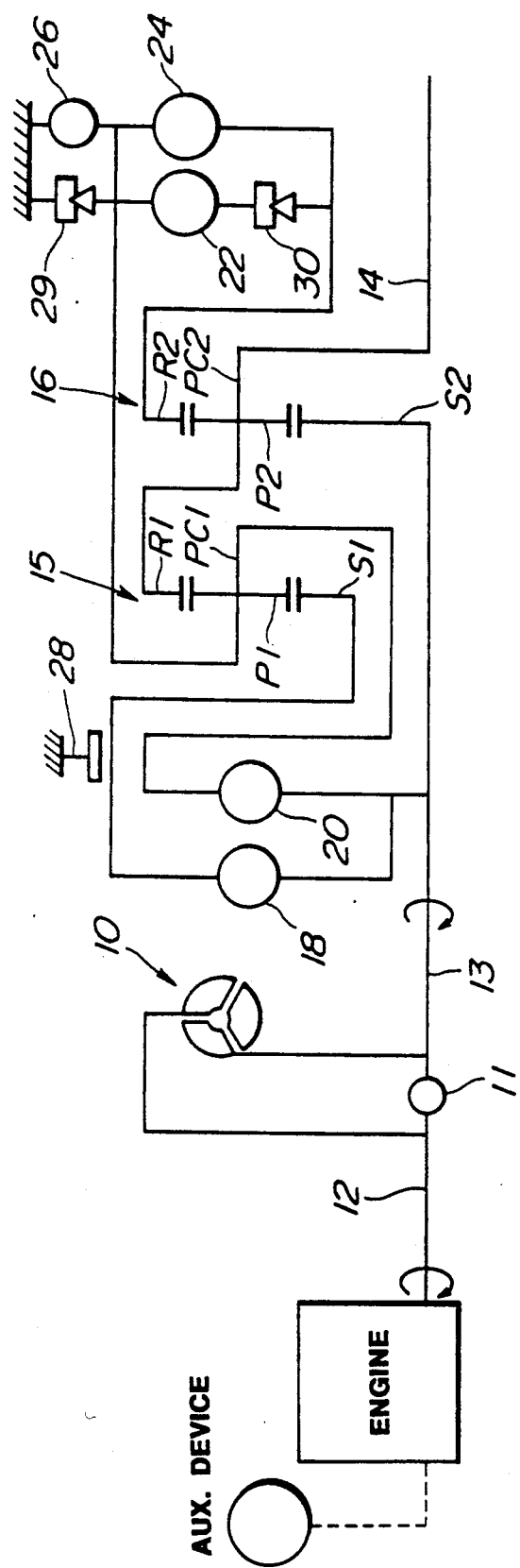
FIG. 1 is a schematic diagram showing the gear train of a transmission of the nature to which the present invention is applied.

FIG. 1 shows a gear train of an example of the type of transmission to which the present invention can be applied. In this arrangement, a torque converter 10 operatively interconnects an engine output shaft 12 and a transmission input shaft 13 in a manner to establish a drive connection therebetween. Although not illustrated, it will be understood that the engine has a throttle valve via which the amount of air which is supplied to the combustion chambers thereof is controlled.

In this embodiment the transmission is of the type which produces four forward speeds with an overdrive and a single reverse. The transmission input shaft 13 is connected to a turbine runner of the torque converter 10, while an output shaft 14 is connected to a final drive gear assembly (not shown). The transmission also includes a first planetary gear set 15, a second planetary gear set 16, a reverse clutch 18, a high clutch 20, a forward clutch 22, an overrunning clutch 24, a low & reverse brake 26, a band brake 28, a low one-way clutch 29, and a forward one-way clutch 30. The torque converter 10 is provided with a lock-up clutch 11.

The first planetary gear set 15 comprises a sun gear S1, a ring gear R1, and a pinion carrier PC1 rotatably supporting pinion gears P1, which mesh with the sun and ring gears S1 and R1. The planetary gear set 16 comprises a sun gear S2, a ring gear R2, and a pinion carrier PC2 rotatably supporting pinion gears P2 which mesh with the sun and ring gears S2 and R2.

The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 which are arranged in series with the forward clutch 22, or via the overrunning clutch 24 which is arranged in parallel to both the forward clutch 22 and forward one-way clutch 30.

The sun gear S2 is directly connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow rotation of the pinion carrier PC1 in a "forward" direction (the same direction as the engine shaft 12), and prevent the rotation in the opposite or "reverse" direction.

In this transmission, the rotation of the various elements (S1, S2, R1, R2, PC1, and PC2) of planetary gear sets 15 and 16 is determined by the selective engagement of the hydraulically operated friction elements, namely, the clutches 18, 20, 22, 24, and brakes 26, 28, in a manner which varies the gear ratio of the transmission i.e., the ratio of the revolution speed of the input shaft 13 to the revolution speed of the output shaft 14.

Four forward speeds and a single reverse speed are provided by actuating the clutches 18, 20, 22, and 24, and the brakes 26 and 28 in the manner illustrated in FIG. 2. It will be noted that in this figure the circles denote engagement of a friction element while oe1 and oe2 denote the ratio of number of teeth of the ring gear R1 to that of the sun gear S1 and a ratio of number of teeth of the ring gear R2 to that of the sun gear S2.

Figure 3:
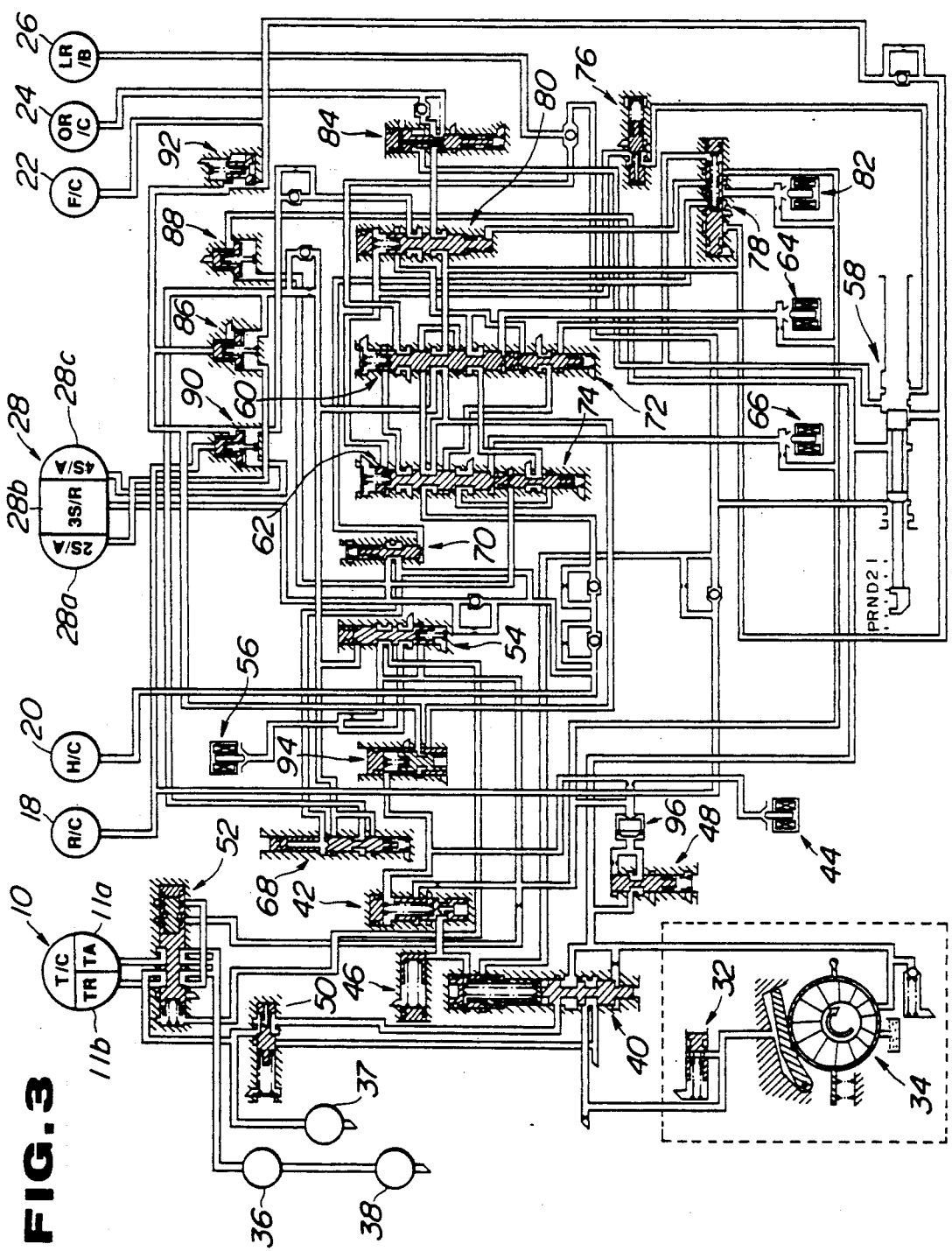
FIG. 3 shows the hydraulic control circuit used to control the engagement of the friction elements of the FIG. 1 gear train.

FIG. 3 shows a hydraulic control system used to control the above described gear train arrangement. This hydraulic control system comprises a line pressure regulator valve 40, a pressure modifier valve 42, a line pressure control solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96 which are interconnected as illustrated.

It will be noted that the above mentioned elements are also circuited with the torque converter 10 (which includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low & reverse brake 26, and the overrunning clutch 24. In addition the circuit also includes a variable capacity vane type oil pump 34, an oil cooler 36, a forward lubrication circuit 37, and a rear lubrication circuit 38 in the illustrated manner.

A detailed description of the operation of these valves is omitted for brevity. However, for further disclosure relating to the same, reference may be had to "NISSAN FULL RANGE ELECTRONICALLY CONTROLLED AUTOMATIC TRANSMISSION RE4R01A TYPE" published by Nissan Motor Company Limited in March, 1987 (publication No. A261C07) and U.S. Pat. No. 4,730,521 issued to Hayasaki et al on Mar. 15, 1989. In this automatic transmission, the magnitude of the line pressure is controlled by a line pressure control solenoid 44. The manner in which the control is carried out is described on pages 1-22 to 1-24 of the above-mentioned service manual. Reference is also made to U.S. Pat. No. 4,807,496 issued to Hayasaki et al on Feb. 28, 1989 for features relating to line pressure control.

Figure 4:
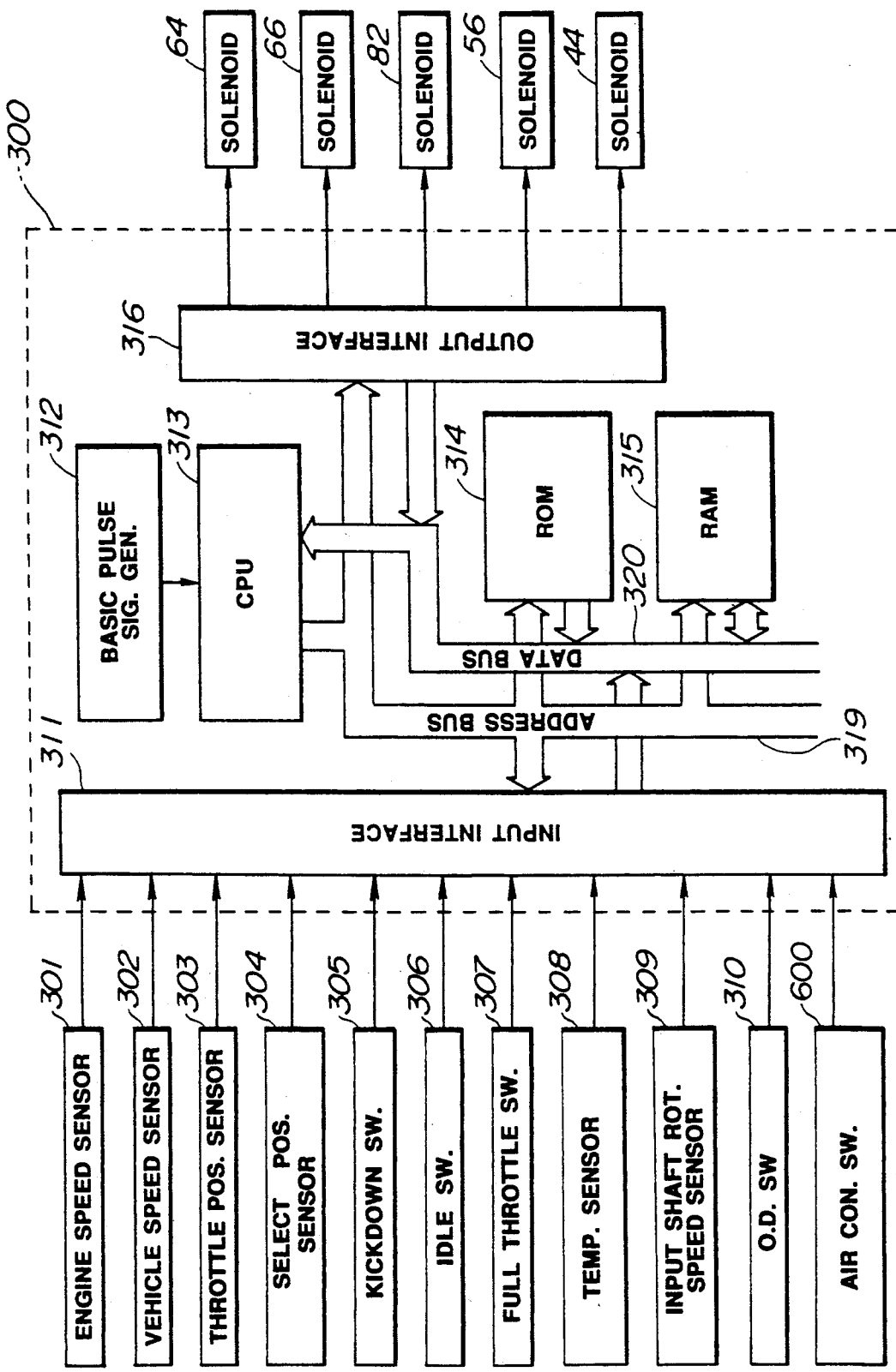
FIG. 4 is a schematic diagram showing the electronic control arrangement which is used in connection with the hydraulic control circuit shown in FIG. 3.

FIG. 4 shows a transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316 which are operatively connected to an address bus 319, and a data bus 320.

The control unit 300 receives signals from an engine revolution speed sensor 301, an output shaft revolution speed sensor (a vehicle speed sensor) 302, a throttle opening degree or position sensor 303, a select position switch 304, a kickdown switch 305, an idle switch 306, a full throttle switch 307, an oil temperature sensor 308, an input shaft revolution speed sensor (turbine revolution speed sensor) 309, an overdrive switch 310 and an air conditioner switch 600.

The outputs of the control unit 300 are supplied to the shift solenoids 64 and 66, overrunning clutch solenoid 82, lock-up solenoid 56, and line pressure control solenoid 44. It will be noted that the shift valves valves 60 and 62 which are responsive to the shift solenoids 64 and 66 while the pressure modifier valve 42 is responsive to the line pressure control solenoid 44.

For further reference to the control of the solenoids 44, 64 and 66, and valves 42, 60 and 62, reference can be had to pages 1-22 to 1-27 of the service manual (publication No. A261C07) and to U.S. Pat. No. 4,730,521.

Figure 5:
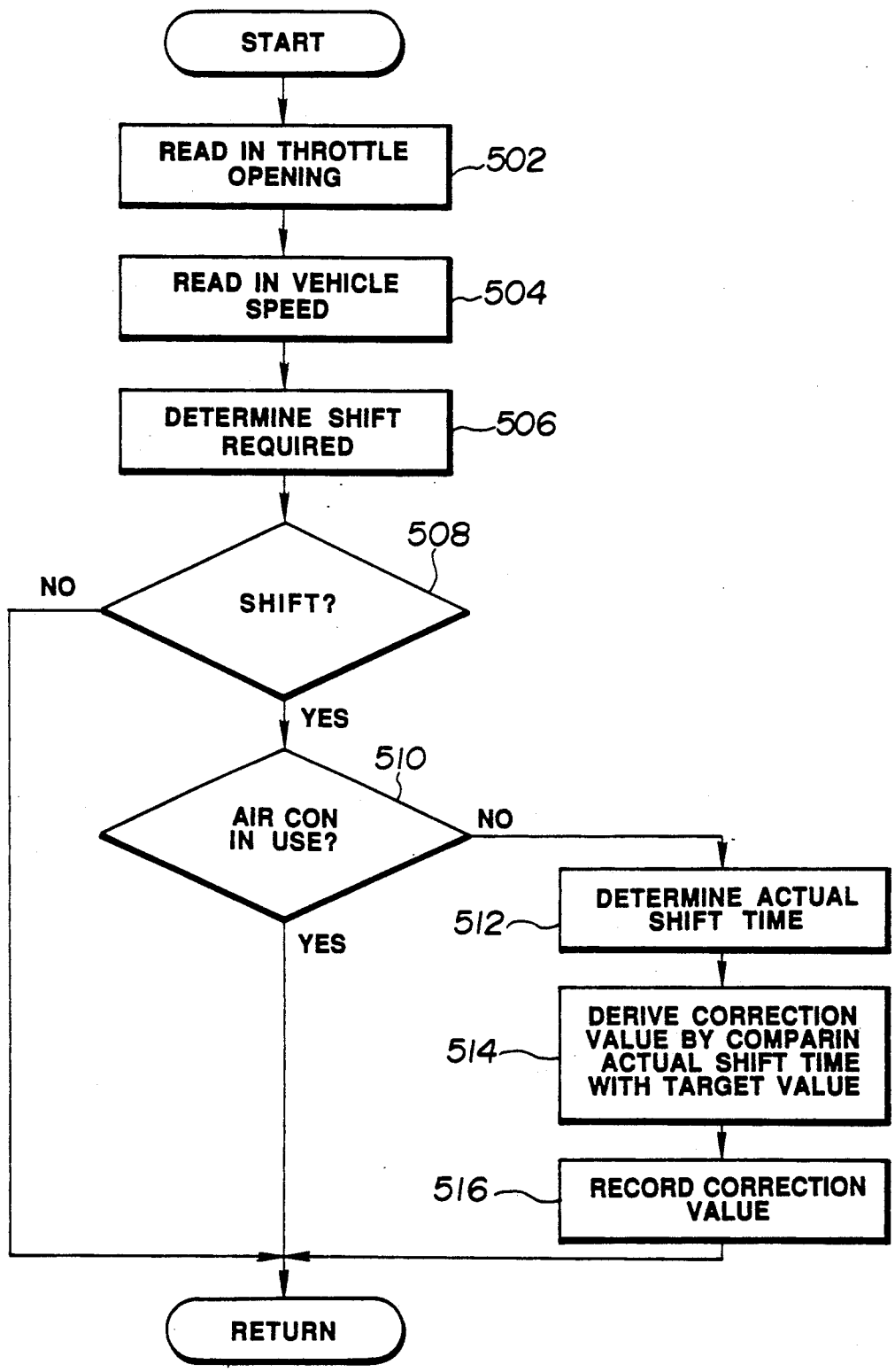
FIG. 5 is a flow chart which depicts the steps of a control routine which implements the control according to the present invention.

In order to control the level of line pressure in accordance with the present invention, the control unit implements a control routine of the nature shown in FIG. 5. As shown, the first two steps 502, 504 of this routine are such as to read in the throttle opening and vehicle speed (viz., parameters indicative of engine load and vehicle speed). In step 506, this data is used in combination with a pre-recorded shift schedule data to determine which gear ratio the transmission should be conditioned to produce. At step 508, the gear ratio nominated in step 506 is compared with the gear ratio currently being produced. In the event that the two gear ratios are the same, the routine returns. However, on the other hand, if there is a difference and a shift is indicated as being necessary, the routine goes onto to step 510 wherein the instant status of the air conditioner switch is determined. In the event that the air conditioner is not in use the routine goes to step 512 wherein the actual shift time is determined by monitoring the rotational speeds of the input and output shafts (viz., the outputs of the output shaft rotational speed sensor 302 and input shaft rotational speed sensor 309). Merely by way of example, the shift time can be taken from the point in time the shift command is issued to the point in time the ratio of the input and output shaft rotational speed assume a value indicative of the gear ratio to which the instant shift is being made.

In step 514 the derived shift time is compared with the value indicative of an optimal shift. The difference, if any, is used to derive a correction value which is recorded in step 516 and subsequently applied to line pressure level control. That is to say, the correction value is used to modify the duty cycle which is being applied to the line pressure control solenoid 44, and thus, in turn, modify the modulation operation of the line pressure regulator valve 40.

However, in the event that the air conditioner is found to be in use, then the routine returns directly from step 510 by-passing the adaptive line pressure correction steps. In this manner the effect of the changes of torque at the input shaft of the transmission due to the use or non-use of high load devices such as air conditioners and the like can be obviated.

It will be noted that the instant invention is not limited to monitoring the operation of air conditioners and may be extended to any other type of load which can be selectively put into use. By way of example, it is within the purview of the instant invention to monitor the condition of the vehicle headlights, interior lights, high drain electrical devices, windshield wipers and servo devices such as oil pumps associated with power steering mechanisms.

What is claimed is:

1. In an automatic transmission which is operatively coupled to an engine, an apparatus for controlling transmission shifting comprising:
    a source of line pressure via which friction elements of the transmission are engaged;
    means for sensing a plurality of operational parameters which are related to transmission shifting and for using the sensed operational parameters to determine a line pressure correction value via which the level of line pressure which is output from said source, is corrected; and
    means for sensing the operation of a device which consumes engine rotational energy and thus reduces the amount of engine torque which is supplied to the transmission when the device is in operation, and for inhibiting the determination of the line pressure correction value during the operation of the device.

2. An automatic transmission as claimed in claim 1, wherein the device which consumes rotational energy is an air conditioner compressor.

3. An automatic transmission as claimed in claim 1, wherein the device which consumes rotational energy is a vehicle power steering device.

4. An automatic transmission as claimed in claim 1, wherein the device which consumes rotational energy is a vehicle headlight.

5. An automatic transmission as claimed in claim 1, wherein the device which consumes rotational energy is a windshield wiper motor.

6. An automatic transmission as set forth in claim 1 wherein said sensing means includes means for sensing engine parameters indicative of engine load and vehicle speed, said engine parameters determining in combination with a predetermined shift schedule which gear ratio the transmission should produce, thus to produce a line pressure correction value therefrom.

7. An automatic transmission as set forth in claim 6 wherein said sensing means includes means for comparing the gear ratio the transmission should produce with the gear ratio currently being produced to initiate a shift under predetermined conditions.

8. In a vehicle, an apparatus for controlling transmission shifting comprising:
    an engine for producing rotational energy;
    a transmission;
    means for operatively connecting said transmission to said engine for receiving rotational energy therefrom, the transmission including a source of line pressure via which friction elements of the transmission are operated;
    a device which consumes rotational energy produced by the engine and reduces the amount of rotational energy supplied from the engine to the transmission, when in use;
    sensor means for sensing transmission operational parameters;
    line pressure control means responsive to said sensor means for producing a correction value via which the level of line pressure which is produce by said source, is corrected; and
    means responsive to the operation of said device for inhibiting the production of the correction value via which the line pressure level is corrected, during the operation of said device.

9. An automatic transmission as claimed in claim 8, wherein the device which consumes rotational energy is an air conditioner compressor.

10. An automatic transmission as claimed in claim 8, wherein the device which consumes rotational energy is a vehicle power steering device.

11. An automatic transmission as claimed in claim 8, wherein the device which consumes rotational energy is a vehicle headlight.

12. An automatic transmission as claimed in claim 8, wherein the device which consumes rotational energy is a windshield wiper motor.

13. An automatic transmission as set forth in claim 8, wherein said sensing means includes means for sensing engine parameters indicative of engine load and vehicle speed, said engine parameters determining in combination with a predetermined shift schedule which gear ratio the transmission should produce, thus to produce a line pressure correction value therefrom.

14. An automatic transmission as set forth in claim 13 wherein said sensing means includes means for comparing the gear ratio the transmission should produce with the gear ratio currently being produced to initiate a shift under predetermined conditions.

* * * * *